(12) United States Patent
O'Hara et al.

(10) Patent No.: US 6,654,205 B1
(45) Date of Patent: Nov. 25, 2003

(54) AIR BEARING SURFACE FOR REDUCING PRESSURE GRADIENTS

(75) Inventors: Matthew A. O'Hara, Oakland, CA (US); David E. Fowler, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/430,878

(22) Filed: Nov. 1, 1999

(51) Int. Cl.$^7$ ............................................... G11B 17/32
(52) U.S. Cl. .................................................... 360/236.3
(58) Field of Search ........................... 360/236.3, 236.4, 360/236.5, 119, 122

(56) References Cited

U.S. PATENT DOCUMENTS

| | | | |
|---|---|---|---|
| 4,669,011 A | 5/1987 | Lemke | 360/103 |
| 4,802,042 A * | 1/1989 | Strom | 360/236.3 |
| 5,041,932 A | 8/1991 | Hamilton | 360/104 |
| 5,253,232 A | 10/1993 | Akagi et al. | 369/13 |
| 5,255,141 A | 10/1993 | Valstyn et al. | 360/126 |
| 5,267,104 A | 11/1993 | Albrecht et al. | 360/97.02 |
| 5,267,109 A * | 11/1993 | Chapin et al. | 360/236.5 |
| 5,418,667 A | 5/1995 | Best et al. | 360/103 |
| 5,455,730 A | 10/1995 | Dovek et al. | 360/113 |
| 5,499,149 A | 3/1996 | Dovek | 360/103 |
| 5,508,862 A * | 4/1996 | Lazzari et al. | 360/236.7 |
| 5,513,056 A * | 4/1996 | Kawasaki et al. | 360/236.7 |
| 5,535,073 A | 7/1996 | Brezoczky et al. | 360/105 |
| 5,650,892 A | 7/1997 | Dorius et al. | 360/103 |
| 5,673,156 A | 9/1997 | Chen et al. | 360/97.01 |
| 5,734,519 A | 3/1998 | Fontana, Jr. et al. | 360/97.01 |
| 5,748,408 A * | 5/1998 | Barrois et al. | 360/236.7 |
| 5,768,055 A | 6/1998 | Tian et al. | 360/103 |
| 5,771,570 A | 6/1998 | Chhabra et al. | 29/603.06 |
| 5,822,153 A | 10/1998 | Lairson et al. | 360/104 |
| 5,872,685 A | 2/1999 | Park et al. | 360/103 |
| 5,898,542 A | 4/1999 | Koshikawa et al. | 360/103 |
| 5,909,340 A | 6/1999 | Lairson et al. | 360/104 |
| 5,982,583 A | 11/1999 | Strom | 360/103 |
| 5,991,119 A | 11/1999 | Boutaghou et al. | 360/103 |
| 5,995,324 A | 11/1999 | Haddock et al. | 360/103 |
| 6,040,965 A * | 3/2000 | Terunuma et al. | 360/236.5 |
| 6,043,960 A * | 3/2000 | Chang et al. | 360/119 |
| 6,069,770 A * | 5/2000 | Cui et al. | 360/236.6 |
| 6,128,163 A | 10/2000 | Haddock et al. | 360/237.1 |
| 6,243,234 B1 | 6/2001 | Haddock et al. | 360/237.1 |
| 6,282,061 B1 * | 8/2001 | Kanda et al. | 360/236.5 |
| 6,317,294 B1 * | 11/2001 | Wada et al. | 360/236 |

* cited by examiner

*Primary Examiner*—Allen Cao
(74) *Attorney, Agent, or Firm*—Sheridan Ross P.C.

(57) ABSTRACT

Sliders having air bearing surfaces are disclosed for use with magnetic recording and reading heads in a magnetic disk drive assembly to reduce the pressure gradients resulting from the flow of air between the slider and the spinning disk. To relieve such pressure gradient, the bottom surface of the air bearing surface at or near the trailing edge includes one or more recesses, which may be one or more steps, inclined ramps, curves or other configurations. Other surfaces of the slider may also include recesses to relieve these pressures. The sliders having air bearing surfaces may be attached to, or integral with, a magnetic recording or reading head in a magnetic disk drive assembly. A method of reducing the formation of pressure gradients is also disclosed whereby air flow between the disk and the head creates a pressure greater than atmospheric, at least a part of which is released through a recess on the air bearing surface of the slider.

25 Claims, 4 Drawing Sheets

AIR BEARING SURFACE FOR REDUCING PRESSURE GRADIENTS

FIELD OF THE INVENTION

This invention generally relates to air bearing surfaces on sliders used with magnetic recording heads in a magnetic disk drive assembly. More particularly, this invention relates to modifying the air bearing surface at the trailing edge of the slider to reduce the pressure gradients created by the air flow, the air bearing surface and the spinning disk beneath it.

BACKGROUND OF THE INVENTION

Head assemblies in hard disk drives include a magnetic transducer to write data onto a disk and/or read data previously stored on a disk. A thin film transducer performs both read and write operations. A magneto-resistive transducer performs only read functions and must be used in combination with a thin film transducer for full read/write capabilities. Regardless of the magnetic transducer employed, head assemblies typically include a body or slider having an air bearing surface which, in part, functions to position the magnetic transducer a specified distance from the surface of the disk. Air bearing surfaces vary, but generally include one or more elongated sections called rails that may extend substantially the length of the slider, but typically less than the width. The rails may or may not be connected to each other at various sections. The magnetic transducer typically is positioned towards the trailing edge of the air bearing surface.

A primary goal of disk drive assemblies is to provide maximum recording density on the disk. A related goal is to increase reading efficiency or to reduce reading errors, while increasing recording density. Reducing the distance between the magnetic transducer and the recording medium of the disk generally advances both of those goals. Indeed, from a recording standpoint, the slider is ideally maintained in direct contact with the recording medium (the disk) to position the magnetic transducer as close to the magnetized portion of the disk as possible. However, since the disk rotates many thousands of revolutions per minute or more, continuous direct contact between the slider and the recording medium can cause unacceptable wear on these components. Excessive wear on the recording medium can result in the loss of data, among other things. Excessive wear on the slider can result in contact between the magnetic transducer and recording medium resulting, in turn, in failure of the magnetic transducer, which can cause catastrophic failure.

Similar to recording, the efficiency of reading data from a disk increases as the read element is moved closer to the disk. Because the signal to noise ratio increases with decreasing distance between the magnetic transducer and the disk, moving the magnetic transducer closer to the disk increases reading efficiency. As such, magneto-resistive heads in current disk drives typically operate at an average spacing from the disk surface of approximately 30 nanometers to up to approximately 70 This range of spacing is required due to several reasons, including manufacturing tolerances of the components, texturing of the disk surface and environmental conditions, such as altitude and temperature. These factors, and others, result in variances in the spacing between the magnetic transducer and the disk, which can cause the magnetic head to fly too low and contact the spinning disk.

To prevent undue wear of the magnetic transducer and the recording medium while maintaining an acceptable recording density, the bottom surface of sliders typically are configured as an air bearing surface. The rotation of the disk creates a flow of air along its surface. The air bearing surface interacts with the air flow, causing the slider to float above the spinning disk surface. As long as the disk is spinning and the slider is positioned above the disk, the slider floats slightly above the disk, thereby substantially eliminating wear to both the disk and the slider. This behavior is characterized by the Reynold's equation.

When the assembly is at rest, the bottom surface of the slider generally rests directly on the surface of the disk. When the assembly is in operation, the moving air generated by the spinning disk lifts the slider off the surface of the disk and opens a volume of space through which air flows. As the slider lifts off the surface of the disk, it typically is positioned at an angle relative to the disk, with the trailing edge closest to the surface of the disk. Because the air bearing surface is on the bottom of the slider and has a generally flat surface parallel to the slider and because the slider is free to pivot, the trailing edge of the air bearing surface is closer to the surface of the disk than is the leading edge of the air bearing surface. As air flows through this space, from the leading edge to the trailing edge of the slider, the pressure of the air builds as the air passes through a diminishing volume of space. The pressure typically reaches a maximum near the trailing edge of the slider, where the distance between the slider and the disk approaches its minimum. Beyond the boundary of the trailing edge of the slider, the compressed air returns to atmospheric pressure, creating a pressure gradient. Other pressure gradients may also be created along the other edges of the slider.

One type of slider design utilizes two separate rails running essentially the length of the slider. This design, referred to as an open design, is relatively slow to lift the head assembly off the disk. To attempt to overcome this, another type of slider design utilizes two rails joined at the leading edge to form, from the bottom view, a U-shaped configuration. This U-shaped slider design, also referred to as a closed design, allows for the formation of sub-ambient pressure under the slider, which in turn allows for the generation of more positive pressure to more quickly lift the assembly head off the disk.

In existing slider designs, a significant pressure gradient can result in the formation of liquid droplets on the slider, if condensable vapors, such as water vapor, are present in the air between the slider and the disk. The accumulation of such liquid can cause severe problems. For example, after the disk stops spinning, the slider rests in static contact with the surface of the disk. The liquid formed on the slider may cause the slider to adhere to the surface of the disk, inhibiting or even preventing the slider from separating from the disk in subsequent operation. This adhesive force can be sufficient to cause the entire magnetic disk drive assembly to fail.

Therefore, a need exists to reduce pressure gradients, and the resulting liquid droplet formations, that are caused by the structure and operation of existing magnetic disk drive assemblies.

SUMMARY OF THE INVENTION

The present invention generally relates to improvements in the design and operation of air bearing surfaces on sliders used with head assemblies in a magnetic disk drive. More particularly, in one embodiment of the present invention, the air bearing surface of a slider has a recess adjacent the trailing edge to reduce the pressure gradient created by the air flow passing between the spinning disk and the trailing edge of the slider and reduce the formation of liquid droplets on the slider. This recess may take any of several forms, including one or more steps, an inclined plane or even a curve.

In another embodiment of the invention, the rail on which the air bearing surface is formed has a leading surface with a defined height and a trailing surface with a defined height less than that of the leading surface. The difference in these heights reduces the pressure gradient created by the air flow of an operating assembly and reduces the formation of liquid droplets.

In yet another embodiment of the invention, the rail on which the air bearing surface is formed has a leading surface with a height greater than the height of the trailing surface, and a bottom surface with a first section that is substantially planar from the leading surface almost to the trailing surface and a second section that extends from the end of the first section to the trailing surface. The bottom surface of this second section may be of several forms, including one or more steps, an inclined plane or even a curve.

In another embodiment of the invention, the difference between the height of the leading edge of a rail and the height of the trailing edge of a rail may be proportional to or may be substantially the same as the flying height of the slider.

In another embodiment of the invention, other portions of the air bearing surface of a slider are modified to reduce the pressure buildup and/or the pressure gradients resulting from the air flow over the spinning disk.

The invention is further embodied in a method to reduce the formation of pressure gradients associated with a magnetic disk drive assembly by generating a flow of air between a recording medium and the assembly, positioning the assembly within a predetermined range of distances from the recording medium, allowing the flow of air to create pressure therein and releasing at least a part of the pressure through a recess near the trailing edge of the assembly.

DETAILED DESCRIPTION OF THE INVENTION

The present invention generally relates to improvements in the design and operation of air bearing surfaces of sliders used with magnetic recording heads in a disk drive assembly. By their structure and through their use, conventional air bearing surfaces used in these applications can create undesirable pressure gradients and thereby condense ambient vapors onto the slider itself Condensation, in turn, can impair the operation of the drive. A variety of improvements to conventional slider designs are disclosed herein that, alone or in combination, reduce these pressure gradients and reduce the severity of the problems associated with pressure gradients. The improved slider structures reduce the pressure gradient at the trailing edge of the slider. With these reductions in pressure gradients, condensation of ambient condensable vapors is reduced, along with attendant problems.

Figure 1:
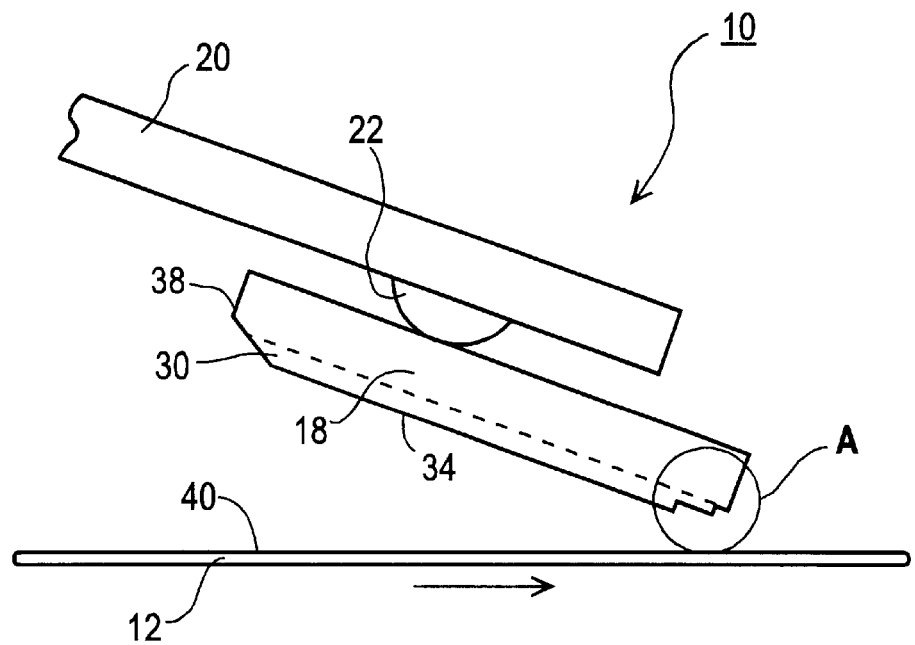
FIG. 1 is a side view of a portion of a magnetic disk drive assembly showing a slider adjacent to a portion of a disk and having an air bearing surface of the present invention.

In one embodiment of the invention, and referring to FIG. 1, a magnetic head disk assembly 10 comprises at least one magnetic transducer 16, at least one slider 18, and at least one disk 12. The slider 18 is positioned relative to the rotating disk 12 by an actuator assembly, including a flexure 20 and a gimbal 22. The flexure 20 and gimbal 22 typically allow the slider 18 to rotate in two directions relative to the surface of the disk 12. The slider 18 also assists in positioning the magnetic transducer 16 relative to the disk 12. The slider 18 comprises a pair of rails 30, 32, an air bearing surface 34 disposed on rails 30, 32, a trailing edge 36, and a leading edge 38 located opposite the trailing edge 36. A magnetic transducer 16 is disposed within the slider 18 proximate the trailing edge 36. The air bearing surface 34 generally faces the recording surface 40 of the disk 12. Typically, when the magnetic disk drive assembly is in operation with the disk 12 spinning, the leading edge 38 of the slider 18 is spaced farther away from the disk 12 than is the trailing edge 36 of the slider 18. This spatial difference remains substantially constant during operation of the drive, excluding spin up and spin down times.

Figure 3:
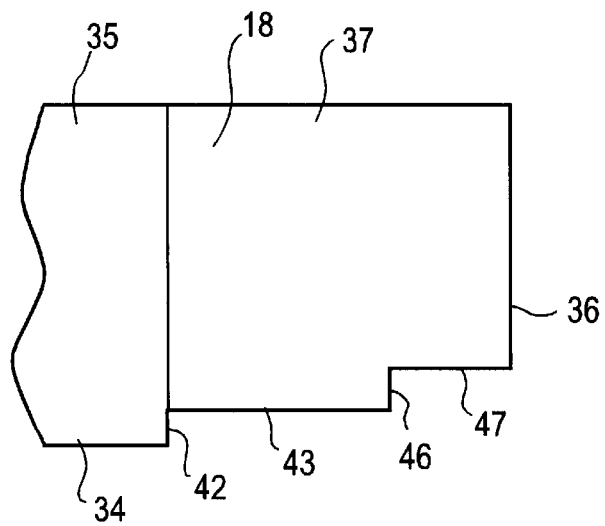
FIG. 3 is an enlarged, partial cross sectional view of the trailing edge of the air bearing surface depicted in FIG. 1.
Figure 4:
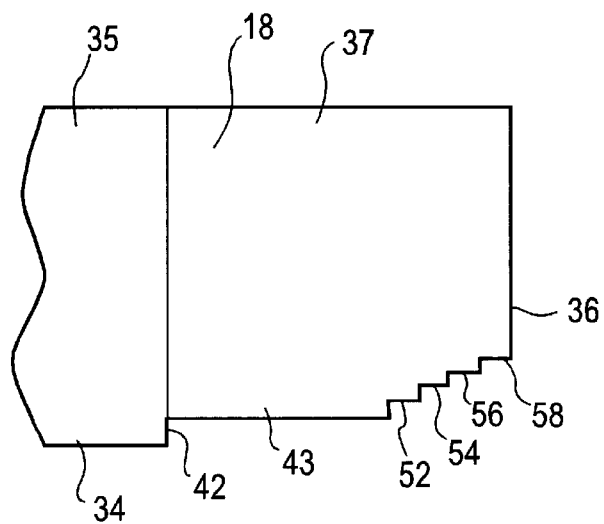
FIG. 4 is an enlarged, partial cross sectional view of an alternative trailing edge of an air bearing surface of the present invention.

The slider 18 may be constructed of a variety of ceramic materials, including wear resistant compositions, such as alumina-titanium-carbide and silicon carbide or, a film of carbon may be deposited on the exterior surface. A composition of alumina and titanium-carbide is commonly used due to its relatively high resistance to wear. Alternatively, part or even all of the slider 18 may be composed of alumina, which is less wear resistant but is easier to etch or otherwise remove material to form the slider 18 into its desired shape. Preferably, as shown in FIGS. 3 and 4, the slider 18 is constructed of an alumina-titanium-carbide composition in section 35, with alumina in section 37.

The spacing between the magnetic transducer 16 and the disk 12 during operation is determined by many factors, such as a slider pitch angle, a dynamic pitch response, and the slider manufacturing tolerances among others. Each of these factors can be accounted for to achieve a desired spacing between the magnetic transducer 16 and the disk 12.

A slider pitch angle refers to the angle formed between the slider 18 and the disk 12. A typical slider pitch angle is from about 100 micro radians to about 400 micro radians, and more preferably from about 150 micro radians to about 200 micro radians.

Figure 2:
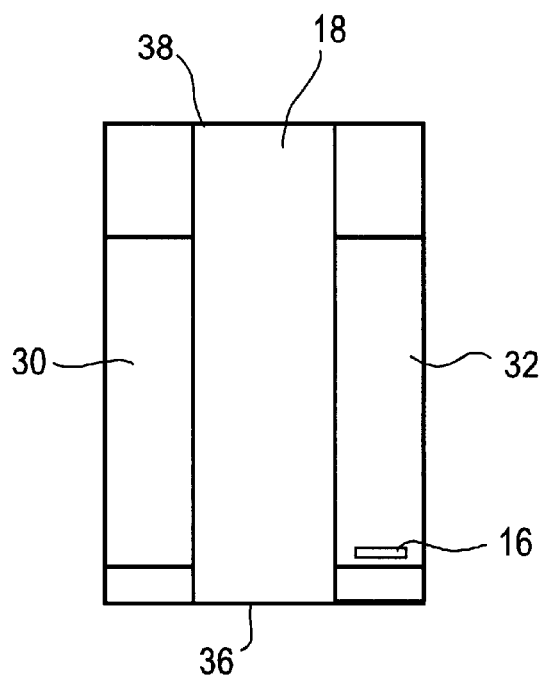
FIG. 2 is a bottom view of a slider of one embodiment of the present invention, showing an air bearing surface comprising two rails.

The air bearing surface 34 of the slider 18 can be of any shape, including for example configurations that are relatively flat, semi-cylindrical, or bowl shaped. FIG. 2 depicts a bottom view of a magnetic head assembly 10 with slider 18 having two rails 30, 32. As shown in FIG. 1, for a relatively flat shaped air bearing surface 34, the leading edge 38 of the slider 18 is raised above the surface 40 of the disk 12. This is caused by the pitch. If the slider is cylindrical, the slider crown is the height of the apex of the cylindrical surface on the bottom of the slider. Slider crown is from about 30 nanometers to about 50 nanometers, for a 30% form factor slider. A 30% slider refers to a de facto industry standard slider configuration having a dimension of 1.25 mm (length)×1.0 mm (width)×0.30 mm (height).

When the disk 12 is at rest, all or a portion of the air bearing surface 34 may be in direct contact with the surface 40 of the disk 12. In operation, the disk 12 spins at many thousands of revolutions per minute, creating a flow of air above the surface 40 of the disk 12. This air flow interacts with the air bearing surface 34 of the slider 18 to lift the slider 18 slightly off the surface 40 of the disk 12. Conventional magnetic recording head assemblies operate at an average spacing of approximately 30 nanometers above the surface 40 of the spinning disk 12.

As shown in FIG. 1, the air bearing surface 34 of the slider 18 is typically positioned at an angle relative to the disk 12, with the trailing edge 36 closer to the disk 12 than the leading edge 38. As air flows through the space between the disk 12 and the air bearing surface 34 of the slider 18, from the leading edge 38 to the trailing edge 36, the pressure builds as the air passes through a diminishing volume of space. The pressure reaches a maximum near the trailing edge 36 of the slider 18, where the distance between the slider 18 and the disk 12 approaches its minimum. Beyond the boundary of the trailing edge 36 of the slider 18, the compressed air returns to atmospheric pressure. This pressure gradient can result in the formation of liquid droplets on the slider 18, if condensable vapors, such as water vapor, are present in the ambient air. Liquid droplets that form on the slider may deposit on the disk. This can lead to a temporary increase in separation, with its attendant problems including loss of data while writing and loss of service.

Figure 5:
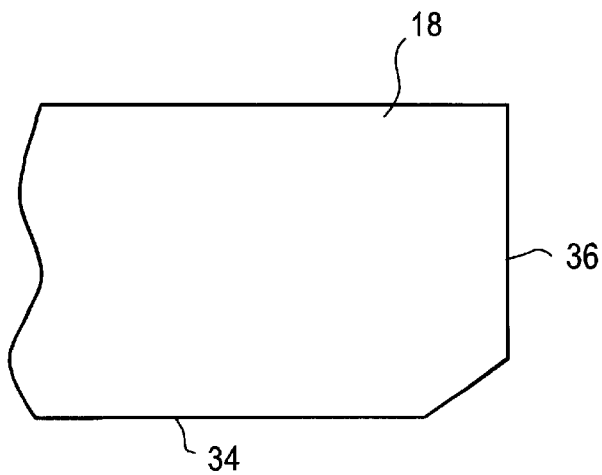
FIG. 5 is an enlarged, partial cross sectional view of yet another alternative trailing edge of an air bearing surface of the present invention.

To reduce the pressure gradient in the space between the air bearing surface 34 of the slider 18 and the disk 12 the present invention discloses relieving the overall height of the air bearing surface 34 at or near the trailing edge 36 of the slider 18. For example, the air bearing surface 34 may be relieved slightly to allow the increased pressure to be reduced more gradually and thereby reduce the pressure gradient. Many different configurations may form this relief, including a single step, a series of steps, an inclined ramp, a curve or a combination of these. FIGS. 3, 4, 5 show three of such possible configurations.

In one embodiment of the invention, as shown in FIG. 3, the trailing edge 36 of the air bearing surface 34 of the slider 18 comprises two steps that effectively increase the separation between the slider 18 and the disk 12 near the trailing edge 36. The total depth of the steps preferably is proportional to the flying height of the slider 18 over the disk 12. Most preferably, the total depth of the steps is approximately the same as the flying height.

The equation that governs the pressure under the slider includes a pressure term that relates to ambient pressure, a velocity term that relates to the speed of the spinning disk, and a pressure gradient term. Each of these terms may be described as proportional to some power of the minimum spacing. In this application, the velocity term begins to dominate as the spacing becomes smaller. With the velocity term increasing approximately 1/h, where h is the minimum spacing, doubling the spacing will approximately halve the pressure.

As shown in FIGS. 2 and 3, preferably the first step has a depth 42 of about 2.54 nanometers and has a length 43 of about 5 microns, and the second step has a depth 46 of about 25.4 nanometers and a length 47 of about 12.5 microns. Alternatively, this second step reduction can occur over a series of several smaller steps that total the preferred about 25.4 nanometer reduction in slider 18 height. For example, FIG. 4 shows this second step reduction occurring over a series of four smaller steps 52, 54, 56, 58. Such smaller steps may individually be of any size as long as the desired total second step reduction is achieved. For ease of manufacturing and quality review, among other things, it is preferred that such smaller steps be approximately the same dimensions, if used. Yet another alternative, shown in FIG. 5, is to create an inclined ramp by angling the 25.4 nanometer reduction in slider 18 height over the final 12.5 microns of the trailing edge 36 of the slider 18.

Figure 6:
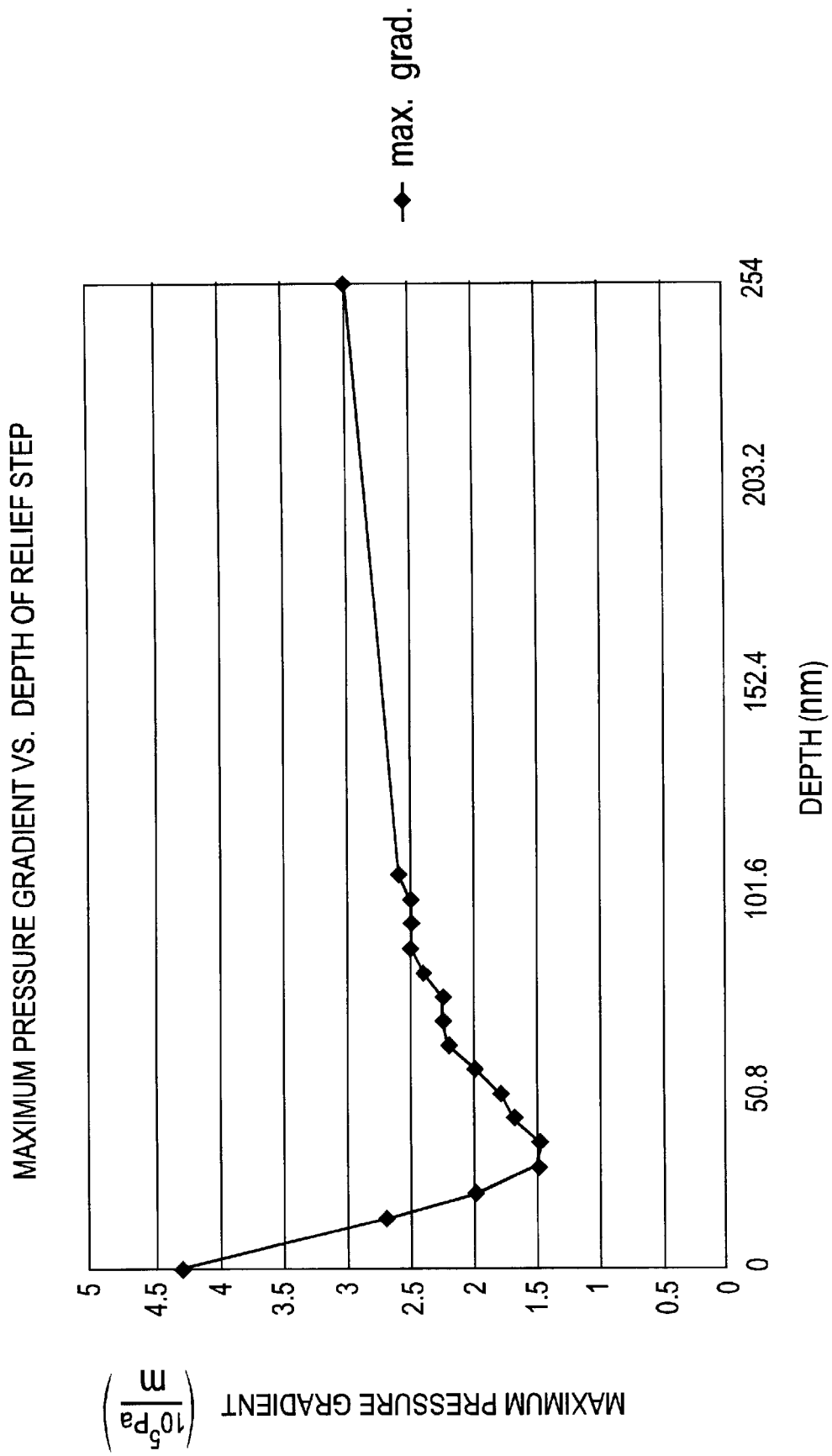
FIG. 6 is a graph depicting the maximum pressure gradient as a function of the depth of the relief step on the trailing edge of an air bearing surface of one embodiment of the present invention.
Figure 7:
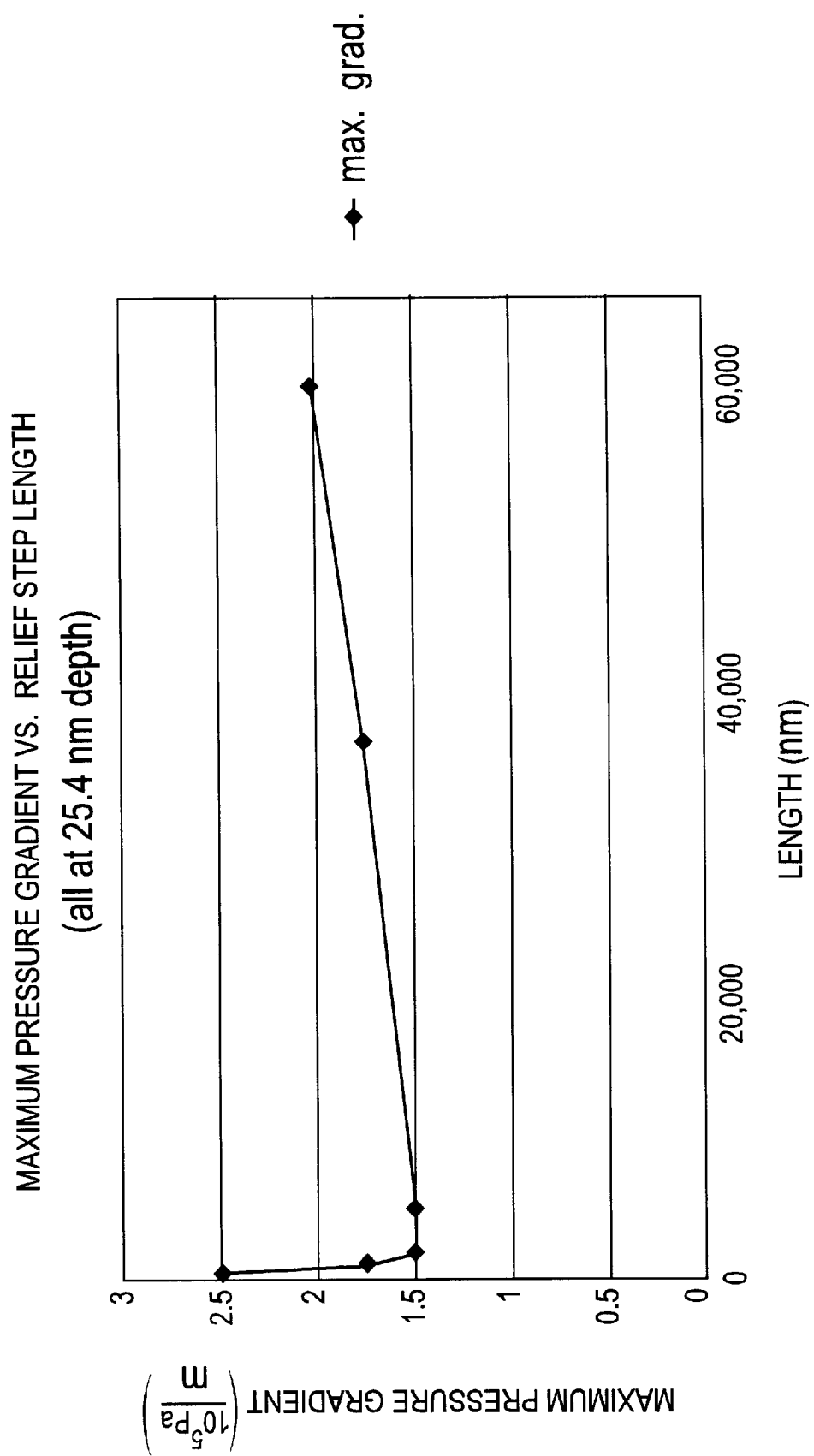
FIG. 7 is a graph depicting the maximum pressure gradient as a function of the length of the relief step on the trailing edge of an air bearing surface of one embodiment of the present invention.

The small reduction in the overall height of the air bearing surface 34 at the trailing edge 36 of the slider 18 results in a surprisingly large reduction in the pressure gradient. Indeed, as shown in FIG. 6, a relief step of the present invention having a depth of only approximately 25.4 nanometers results in the lowest pressure gradient. Also, as shown in FIG. 7, a relief step of the present invention having a depth of approximately 25.4 nanometers, and a length of only approximately 5 microns results in the lowest pressure gradient.

The foregoing description of the present invention has been presented for purposes of illustration and description. The description is not intended to limit the invention to the form disclosed herein. Consequently, variations and modifications commensurate with the above teachings, and the skill or knowledge of the relevant art, are within the scope of the present invention. The embodiment described herein is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A head-slider assembly for a disk drive, comprising:
    a slider body including a leading surface, a trailing surface and a bottom surface disposed between said leading surface and said trailing surface, and a multi-level recess at the junction of said trailing surface and said bottom surface, and at least one level of said multi-level recess having a depth of less than approximately 100 nanometers and greater than zero nanometers; and,
    a transducer disposed within said slider body forward of said multi-level recess.

2. A head-slider assembly, as claimed in claim 1, wherein at least one level of said multi-level recess has a depth of approximately 25 nanometers.

3. A head-slider assembly, as claimed in claim 1, wherein said multi-level recess extends laterally the entire width of said bottom surface.

4. A head-slider assembly, as claimed in claim 1, wherein said multi-level recess comprises a first and second portion of said slider body longitudinally disposed such that said first portion is at said trailing surface and said second portion is forward of said first portion.

5. A head-slider assembly, as claimed in claim 4, wherein said first portion has a greater depth than said second portion.

6. A head-slider assembly, as claimed in claim 5, said second portion has a depth of less than approximately 5 nanometers and greater than zero nanometers, and said first portion has a depth of less than approximately 25 nanometers and greater than said second position.

7. A head-slider assembly, as claimed in claim 1, wherein at least one level of said multi-level recess has a depth approximately proportional to the flying height of said slider body.

8. A slider body for a disk drive head assembly, comprising:
- a slider body having a leading surface, a bottom surface, a trailing surface, and a pair of side walls extending along said bottom surface between said leading edge and said trailing edge, said side walls defining a height for said slider body;
- said side walls at said trailing surface having a height less than said height of said slider body by less than approximately 100 nanometers and greater than zero nanometers to form a multiple depth recess at said trailing edge, and;
- a transducer disposed in said slider body, forward of said multiple depth recess.

9. A slider body, as claimed in claim 8, wherein said height of said trailing surface is about 50 nanometers less than said height of said leading surface.

10. A slider body, as claimed in claim 8, wherein said height of said trailing surface is less than about 30 nanometers less than said height of said leading surface.

11. A slider body, as claimed in claim 8, wherein the difference between said height of said leading surface and said height of said trailing surface is approximately proportional to the flying height of said slider body.

12. A slider body, as claimed in claim 8, wherein the difference between said height of said leading surface and said height of said trailing surface is substantially the same as the flying height of said slider.

13. A slider body for positioning a transducer in a disk drive, comprising:
- a front side having a height and a width;
- a back side having a height and a width;
- a bottom side connected to said front side and said back side and having a forward section extending from said front side to less than about 60 microns of said back side and a rearward section recessed relative to said forward section and extending from said back side to said forward section, said recess having multiple steps. with the deepest step having a depth of approximately 25 microns and;
- a transducer disposed in said slider body, forward of said recess.

14. A slider body, as claimed in claim 13, wherein said forward section of said bottom side extends from said front side to less than about 10 microns of said back side.

15. A slider body, as claimed in claim 13, wherein said forward section of said bottom side extends from said front side to said back side within a range between approximately 5 to 10 microns.

16. A slider body, as claimed in claim 13, wherein said rearward section of said bottom side comprises a first step having a length of less than about 30 microns and a depth of less than about 3 nanometers and greater than zero nanometers and a second step having a length of less than about 15 microns and a depth of less than about 30 nanometers and greater than the depth of said first step.

17. A slider body, as claimed in claim 13, wherein said rearward section of said bottom side comprises at least two steps totaling less than about 30 microns in length and totaling less than about 30 nanometers and greater than zero nanometers in depth.

18. A slider body, as claimed in claim 13, wherein the difference between said height of said front side and said height of said back side relative to the surface of a spinning disk is proportional to the flying height of said slider body relative to the surface of the spinning disk.

19. A slider body, as claimed in claim 13, wherein the difference between said height of said front side and said height of said back side relative to the surface of a spinning disk is substantially the same as the flying height of said slider body relative to the surface of the spinning disk.

20. A disk drive comprising:
- a spin motor for rotating at least one disk, said disk having an inner radius and an outer radius and a recording medium for storing data that includes a plurality oft racks which are located between said inner radius and said outer radius to provide a recording surface;
- a transducer for use in transferring data to and from said recording medium;
- a slider body for holding and positioning said transducer with respect to said disk, said slider body including a leading edge, a trailing edge and a bottom surface disposed between said leading and trailing edges, and a multi-level recess disposed at said trailing edge; and
- an actuator for positioning said slider body and said transducer at a location between said inner radius and said outer radius of the disk.

21. A method to reduce the formation of pressure gradients generated between a magnetic head assembly and a spinning disk in a disk drive, comprising:
- providing a magnetic head assembly comprising a slider body with a transducer positioned forward of the trailing edge of said slider body;
- generating a flow of air between a spinning disk and said slider body;
- positioning said slider body within a predetermined range of distances from the surface of said spinning disk;
- providing a multi-level recess, with the deepest level having a depth of less than about 100 nanometers and greater than zero nanometers at the trailing edge of said slider body.

22. The method of claim 21, wherein providing said recess comprises providing a multilevel recess.

23. The method of claim 21, wherein the depth of said recess is substantially equal to the flying height of said magnetic head assembly in relation to the surface of the spinning disk.

24. A slider body, as claimed in claim 21, wherein said recess comprises a first and second portion of said slider body longitudinally disposed such that said first portion is adjacent said trailing surface and said second portion is forward of said first portion, said first portion having a depth that is greater than the depth of said second portion.

25. A slider body, as claimed in claim 24, wherein said first portion has a depth of less than approximately 5 nanometers and greater than zero nanometers, and said first portion has a depth of less than approximately 25 nanometers and greater than the depth of said first portion.

* * * * *

UNITED STATES PATENT AND TRADEMARK OFFICE
CERTIFICATE OF CORRECTION

PATENT NO. : 6,654,205 B1
DATED : November 25, 2003
INVENTOR(S) : O'hara et al.

It is certified that error appears in the above-identified patent and that said Letters Patent is hereby corrected as shown below:

Column 6,
Line 63, please add the word -- wherein -- after the words "claim 5," and before the word "said".

Column 7,
Lines 9, 10 and 16, please delete the word "edge" and substitute therefor the word "surface".

Column 8,
Line 17, please delete the word "oft" and substitute therefor the word "of".
Line 18, please delete the word "racks" and substitute therefor the word "tracks".
Lines 44-45, please cancel Claim 22.
Line 47, please add the words -- multi-level -- before the word "recess".
Line 50, please add the words -- multi-level -- after the word "said" and before the word "recess".
Lines 57 and 60, please delete the word "first" and substitute therefor the word "second".

Signed and Sealed this

Sixth Day of April, 2004

JON W. DUDAS
*Acting Director of the United States Patent and Trademark Office*